(12) United States Patent
Kraczek et al.

(10) Patent No.: US 12,084,365 B2
(45) Date of Patent: Sep. 10, 2024

(54) CHARGING WATER OXIDATION REACTOR USING RECOVERED REACTOR ENERGY

(71) Applicant: SREUS ENERGY, LLC, Sandy, UT (US)

(72) Inventors: John Troy Kraczek, Farmington, UT (US); Gordon Ray Whipple, Centerville, UT (US); Paul James Freeman, South Jordan, UT (US)

(73) Assignee: SREUS ENERGY, LLC, Sandy, UT (US)

( * ) Notice: Subject to any disclaimer, the term of this patent is extended or adjusted under 35 U.S.C. 154(b) by 628 days.

(21) Appl. No.: 17/249,505

(22) Filed: Mar. 3, 2021

(65) Prior Publication Data

US 2021/0276898 A1  Sep. 9, 2021

Related U.S. Application Data

(60) Provisional application No. 62/985,636, filed on Mar. 5, 2020, provisional application No. 62/985,612, filed
(Continued)

(51) Int. Cl.
*C02F 1/74* (2023.01)
*F23G 5/12* (2006.01)
(Continued)

(52) U.S. Cl.
CPC .................. *C02F 1/74* (2013.01); *F23G 5/12* (2013.01); *F23K 5/007* (2013.01); *F23L 7/00* (2013.01); *C02F 2103/10* (2013.01); *C02F 2201/005* (2013.01); *C02F 2209/03* (2013.01); *C02F 2303/10* (2013.01); *F23G 2202/30* (2013.01); *F23G 2209/10* (2013.01)

(58) Field of Classification Search
None
See application file for complete search history.

(56) References Cited

U.S. PATENT DOCUMENTS 5,771,693 A * 6/1998 Coney ................... F04B 39/062
60/407
6,739,131 B1 * 5/2004 Kershaw ................ F01K 25/02
60/512

FOREIGN PATENT DOCUMENTS

SU            13340 A1     3/1930

OTHER PUBLICATIONS

International Search Report and Written Opinion for PCT Application No. PCT/US2021/070227, mailed on Aug. 4, 2021, 15 pages.

* cited by examiner

*Primary Examiner* — Clare M Perrin
(74) *Attorney, Agent, or Firm* — Brake Hughes Bellermann LLP

(57) ABSTRACT

A charging system for charging a reactor with air used energy produced by the reactor and includes a vessel having a hollow interior cavity partially filled with a liquid slug, a first air pocket within the cavity on a first side of the liquid slug, and a second air pocket within the cavity on a second side of the liquid slug. The liquid slug forms a water trap seal in the cavity between the two pockets and moves within the vessel in a cycle in which gas is loaded into the first air pocket in a first stroke and gas in the first air pocket is compressed in a second stroke. Movement of the liquid slug during the second stroke is caused by an increasing pressure in the second air pocket due to introduction of high-pressure gas from the reactor into the second air pocket.

26 Claims, 7 Drawing Sheets

Related U.S. Application Data on Mar. 5, 2020, provisional application No. 62/985,652, filed on Mar. 5, 2020, provisional application No. 62/985,733, filed on Mar. 5, 2020, provisional application No. 62/984,752, filed on Mar. 3, 2020.

(51) Int. Cl.
*F23K 5/00* (2006.01)
*F23L 7/00* (2006.01)
*C02F 103/10* (2006.01)

700

Draw charge gas into a first air pocket in a hollow interior of a vessel through a port connected to the first air pocket by dropping a level of the liquid slug below the first air pocket and raising a level of the liquid slug below the second air pocket, where the liquid slug forming a water trap seal against the one or more walls that that define the hollow interior cavity between the first and second air pockets
710

Receive high-pressure gas from a reactor (e.g. a supercritical water oxidation reactor) into the second air pocket, where receiving the high-pressure gas from the reactor into the second air pocket leg lowers a level of the liquid slug below the second air pocket and raises a level of the liquid slug below the first air pocket to compress a volume of the drawn-in charge gas in the first air pocket
720

Inject high-pressure water into the second air pocket, where the second air pocket has a temperature that causes the injected water to vaporize and pressurize the drawn in charge gas in the first air pocket
730

Injecting the pressurized drawn-in charge gas from the first air pocket into the reactor when a pressure of the first air pocket exceeds an operating pressure of the reactor
740

FIG. 7

CHARGING WATER OXIDATION REACTOR USING RECOVERED REACTOR ENERGY

CROSS-REFERENCE TO RELATED APPLICATIONS

This application claims the benefit of and priority to U.S. Provisional Application No. 62/984,752, filed Mar. 3, 2020, U.S. Provisional Application No. 62/985,612, filed Mar. 5, 2020, U.S. Provisional Application No. 62/985,733, filed Mar. 5, 2020, U.S. Provisional Application No. 62/985,636, filed Mar. 5, 2020, and U.S. Provisional Application No. 62/985,652, filed Mar. 5, 2020, these applications are incorporated by reference herein in their entireties.

TECHNICAL FIELD

This disclosure relates to oxidation reactors and, in particular, to charging water oxidation reactors with air, gaseous, liquid, and solid fuel using recovered reactor energy.

BACKGROUND

Supercritical water oxidation reactors (SCWOR) have been used to break down many different forms of contaminates in water, for example, ink, pharma waste, hazardous chemicals, and nerve agents. However, the pressures and temperatures used in SCWORs present challenging problems. For example, the energy cost for compressing and heating the fuel feed stock and the air to charge the reactor can be commercially prohibitive, and unfiltered gaseous feedstocks are corrosive to gas compressors, significantly reducing their effective lifespan.

SUMMARY

In a general aspect, a charging system for charging a high-pressure reactor with gas, using energy produced by the reactor, includes a vessel having one or more walls that define a hollow interior cavity configured to be partially filled with a liquid slug, a first air pocket within the cavity on a first side of the liquid slug, and a second air pocket within the cavity on a second side of the liquid slug, where the liquid slug forms a water trap seal against the one or more walls that that define the hollow interior cavity between the first and second air pockets. A plurality of values are configured to control admission of charge gas into the first air pocket at a pressure lower than an operating pressure of the reactor and to extract charge gas from the first air pocket at a pressure higher than the operating pressure of the reactor and to control the admission of high-pressure gas from the reactor into the second air pocket and to control a release of gas from the second air pocket. A controller is configured to control the operation of one or more of the plurality of values to cause the liquid slug to move within the vessel in a cycle in which gas is loaded into the first air pocket in a first stroke of the liquid slug and gas in the first air pocket is compressed in a second stroke of the liquid slug, where movement of the liquid slug during the second stroke is caused by an increasing pressure in the second air pocket due at least in part to introduction of high-pressure gas from the reactor into the second air pocket, and where the movement of the liquid slug during the first stroke is caused by a decreasing pressure in the second air pocket due at least in part to the release of gas from the second air pocket.

Implementations can include one or more of the following features, alone, or in any combination with each other.

For example, the charging system can additionally include a low-pressure charge gas inlet port configured to admit air into the first air pocket, where the plurality of values includes a first valve configured to control the admission of charge gas through the low-pressure inlet port into the first air pocket. The charging system can additionally include a high-pressure air outlet port configured to extract charge gas from the first air pocket for injection into the reactor when a pressure in the first air pocket exceeds an operating pressure of the reactor by a first threshold, where the plurality of values includes a second valve configured to control the extraction of charge gas from the first air pocket. The charging system can additionally include a high-pressure gas inlet port configured to receive high-pressure gas from the reactor into the second air pocket, where the plurality of values includes a third valve configured to control the admission of high-pressure gas through the high-pressure gas inlet into the second air pocket. The charging system can additionally include a gas outlet port configured to release gasses from the second air pocket, where the plurality of values includes a fourth valve configured to control the extraction of gasses from the second air pocket through the gas outlet port.

The charging system can additionally include a high-pressure, high-temperature liquid inlet port configured to admit high-pressure, high-temperature liquid from the reactor into the second air pocket, where the plurality of values includes a fifth valve configured to control the admission of high-pressure, high-temperature liquid through the high-pressure, high-temperature liquid inlet port into the second air pocket, where movement of the liquid slug during the second stroke is caused by an increasing pressure in the second air pocket due at least in part to the admission of the high-pressure, high-temperature liquid through the high-pressure, high-temperature liquid inlet port into the second air pocket.

The charging system can additionally include a low-temperature liquid inlet port configured to admit low-temperature liquid into the second air pocket, where the plurality of values includes a fifth valve configured to control the admission of low-temperature liquid through the low-temperature liquid inlet port into the second air pocket, where movement of the liquid slug during the second stroke is caused by an increasing pressure in the second air pocket due at least in part to the admission of the low-temperature liquid through the low-temperature liquid inlet port into the second air pocket when the introduced liquid vaporizes within the second air pocket.

The charging system can additionally include a pump configured to supply the low-temperature liquid through the low-temperature liquid inlet port into the second air pocket at a pressure greater than an operating pressure of the reactor.

The vessel may not include mechanical moving parts.

The vessel can include a U-shaped hollow interior cavity, where the U-shaped hollow interior cavity is configured to define the first air pocket at a top of a first straight leg of the U-shaped hollow interior cavity, to define the second air pocket at a top of a second straight leg of the U-shaped hollow interior cavity, where the first and second legs are connected by a curved portion of the hollow interior cavity, and is configured to contain the liquid slug in the hollow interior cavity between the first and second air pockets.

The charging system can additionally include a vapor condenser coupled to the second air pocket, where the vapor condenser is configured for receiving the gas released from the second air pocket and for condensing liquid contained in the received gas.

The charging system can additionally include a blower configured for pushing air under into the first air pocket at a pressure that exceeds atmospheric pressure.

The charging system can additionally include a high-pressure liquid outlet port configured to release liquid from the hollow interior cavity into the reactor at a pressure that exceeds the operating pressure of the reactor, where the plurality of values includes a seventh valve configured to control the release of liquid from the hollow interior cavity into the reactor.

The charging system can additionally include a pressure transducer coupled to the first air pocket and configured measure a pressure of the first air pocket, where the controller is configured to receive a signal from the pressure transducer indicating a pressure of the first air pocket.

The charging system can additionally include a chamber configured for containing fuel for combustion in the reactor. The chamber can be coupled to the high-pressure liquid outlet port of the vessel and being coupled to the reactor. The chamber can be configured to receive liquid released through the high-pressure liquid outlet port of the vessel, to mix the fuel with the released liquid, and to deliver a mixture of the fuel and the released liquid to the reactor.

The charging system can additionally include a sparger configured for receiving the high-pressure gas from the reactor for admission into the second air pocket, where the sparger is located such that the high-pressure gas from the reactor is emitted from the sparger into the liquid slug at least some time during the cycle.

The sparger can be located such that the high-pressure gas from the reactor is emitted from the sparger into the second air pocket, when the second air pocket is located above the liquid slug, at least some time during the cycle.

The charging system can be one or a plurality of charging systems that are substantially functionally identical, and where the plurality of charging systems are coupled by a manifold.

The charge gas can include air. The charge gas can include fuel gas for combustion in the reactor.

In another aspect, a method of charging a reactor with charge gas using energy from the reactor, can include, in a vessel having one or more walls that define a hollow interior cavity partially filled with a liquid slug, a first air pocket within the cavity on a first side of the liquid slug, and a second air pocket within the cavity on a second side of the liquid slug: (a) drawing charge gas into the first air pocket through a port connected to the first air pocket by dropping a level of the liquid slug below the first air pocket and raising a level of the liquid slug below the second air pocket, where the liquid slug forms a water trap seal against the one or more walls that that define the hollow interior cavity between the first and second air pockets; (b) receiving high-pressure gas from a reactor into the second air pocket, where receiving the high-pressure gas from a reactor into the second air pocket leg lowers a level of the liquid slug below the second air pocket and raises a level of the liquid slug below the first air pocket to compress a volume of the drawn-in charge gas in the first air pocket; (c) injecting high-pressure water into the second air pocket, where the second air pocket has a temperature that causes the injected water to vaporize; and (d) injecting the pressurized drawn-in charge gas from the first air pocket into the reactor when a pressure of the first air pocket exceeds an operating pressure of the reactor.

Implementations can include one or more of the following features, alone or in any combination with each other.

For example, the method can additionally include injecting liquid from the liquid slug into the reactor when the pressure of the liquid slug exceeds the operating pressure of the reactor.

The method can additionally include injecting the liquid from the liquid slug into a chamber configured for containing fuel for combustion in the reactor. The chamber can be coupled to the high-pressure liquid outlet port of the vessel and being coupled to the reactor. The method can additionally include mixing the released liquid with the fuel. The method can additionally include delivering a mixture of the fuel and the released liquid to the reactor.

The injected high-pressure water can have a pressure that exceeds the operating pressure of the reactor.

The injected high-pressure water can have a temperature that is lower than a temperature of the second air pocket.

The method can additionally include releasing gas from the second air pocket to a condenser after the level of the liquid slug is lowered below the second air pocket.

The method can additionally include performing (a), (b), (c), and (d), such that the liquid slug cycles within in the cavity with an oscillation frequency, where the oscillation frequency is within 10% of a natural oscillation frequency of the liquid slug in the cavity.

The charge gas can include air. The charge gas can include fuel gas for combustion in the reactor.

The details of one or more implementations are set forth in the accompanying drawings and the description below. Other features will be apparent from the description and drawings, and from the claims.

BRIEF DESCRIPTION OF THE DRAWINGS

FIG. 7 is a flowchart illustrating method of charging a reactor with charge gas using energy from the reactor, such as using the apparatus of FIGS. 1-6.

Like reference symbols in the various drawings indicate like elements.

DETAILED DESCRIPTION

In a supercritical water oxidation reactors (SCWOR), water is heated and pressurized, so that the temperature of the water is far above the boiling point of water at atmospheric pressure (100° C.) but the pressure is high enough that the water does not boil, even at the elevated temperature. At high temperatures and pressures (e.g., for temperatures above 374° C. and pressures above 3210 psi) water experiences a phase change to a supercritical state, in which the supercritical water acts as an aggressive catalyst of chemical reactions. Even at temperatures and pressures above 100° C. and 15 psi, but below the critical point of water, reactions within the SCWOR are significantly enhanced compared to reactors operating at atmospheric pressure. Thus, contaminants in supercritical water, such as, for example, hazardous chemicals, pharmaceutical waste, hydrocarbons, organic matter can be broken down efficiently when the water enters a supercritical phase.

In some implementations, SCWORs can be used to reduce long chain hydrocarbons and all organic matter. In this process, the hydrogen atoms are released from the hydrocarbon chain and bond to oxygen forming new water ($H_2O$). The carbons freed from the chain become carbon dioxide. Both reactions, like most of the other oxidation reactions that occur in the SCWOR, are exothermic, and the heat from the reactions increases the temperature of the liquid in the reactor.

SCWORs offer the possibility of producing clean energy from sewage, biogas, and other organic materials, because, unlike combustion of fuel in a diesel or boiler furnace, there are no sulfur dioxide emissions released into the air by the fuel used to power a SCWOR, and therefore the SCWOR process is very clean.

Figure 1:
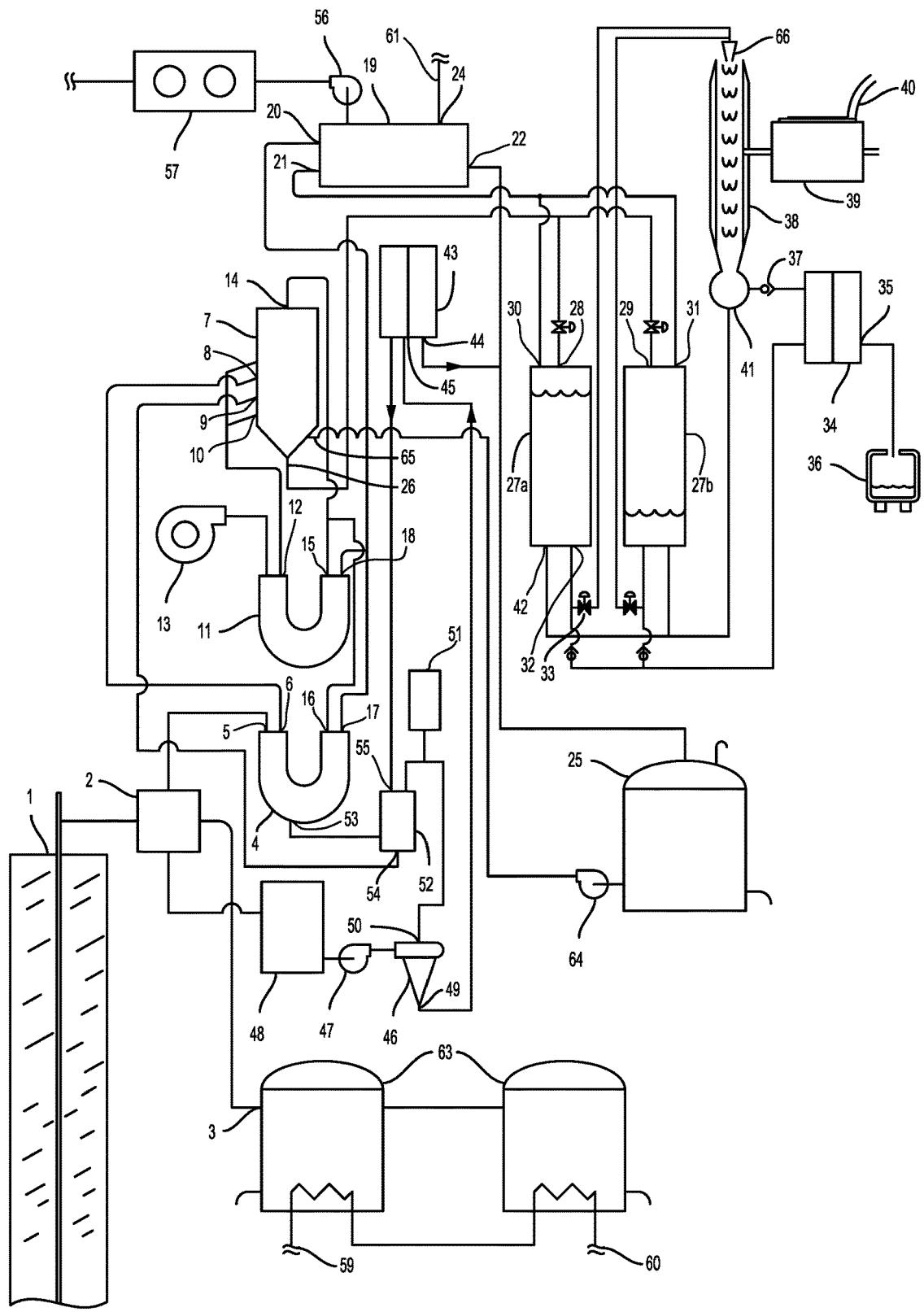
FIG. 1 is a schematic diagram of a supercritical water oxidation reactor system in an embodiment.

FIG. 1 is a schematic diagram of a supercritical water oxidation reactor system 100 in an embodiment. The system 100 can be used, for example, to break down waste material from an oil well. The system 100 includes a source 1 of fuel for a reactor in the system. In an example implementation, source 1 can include an oil well riser, which can provide fuel for the reactor in the form of waste material from an oil well to a water, oil, and gas separator 2. The separator 2 may be an existing component of an oil well and can divide the product stream from the oil well into three streams, including a sour or sweet gas stream that is fed at port 5 to a first charger system 4 that can supply fuel to the supercritical water oxidation reactor 7. The first charger system 4, in the system 100, can be referred to herein as a "U" charger. The separator 2 also may supply oil well production water to a surge tank 48. Oil from the separator 2 can be routed to one or more storage tanks 63 through an input port 3 to the tanks.

The sour or sweet well gas is drawn into first charger system 4, heated and pressurized and sent forward through port 6 to port 8 on a supercritical water oxidation reactor 7. The first charger system 4 can use pressure and energy from the reactor 7 gases to cycle, transferring pressure and heat to sour or sweet gases that are received in the charger system through port 5. Not shown are check and control valves that control the flow of the gas into the reactor 7 and management of the first charger system 4. Reactor 7 also can be fed other reactant streams including air, water, and liquid hydrocarbon when available.

A high-volume moderate pressure blower 13 gathers and compresses air to feed into a second charger system 11. Pressure and heat of the gases leaving the supercritical reactor 7 can feed into second charger system 11 and into first charger system 4 from port 14 of the reactor 7 to port 16 of the first charger system 4 and port 15 of the second charger system 11. The heat and pressure received from the reactor 7 can heat and pressurize air that is input to the charger systems 4 and 11 (e.g., respectively through port 5 and from blower 13) to pressures high enough to enter the reactor 7 through ports 8 and 10. Heated and pressurized gas from charger system 11 can be sent forward through port 12 to input port 10 on the supercritical water oxidation reactor 7.

Spent exhaust steam from cycling first charger system 4 and cycling second charger system 11 can be forwarded through ports 17 and 18, respectively, to vapor condenser 19 though an input port 20 to the condenser, where the steam is condensed, and pure distilled water is released from port 22 to fill a distilled water tank 25. Some of this pure water can be pumped back to the reactor 7, by way of high-pressure pump 64 and received at the reactor at port 65.

Oily water in a surge tank 48 can be pushed forward and pressurized by a pump 47 and then sent through a micro hydro cyclone bank 46 where free oils and droplets (e.g., having diameters as low as 15 microns) can be pushed through cyclone port 50 to a surge tank 51 and, further, to reactor pressure feed tank 52. Check valves (not shown) can prevent back flow from the reactor 7 to the cyclone separator bank 46. When gasses input to the first charger system 4 have reached a sufficiently high pressure (e.g., a pressure above an operating pressure of the reactor 7), a control valve on port 53 opens allowing some water to flow from the first charger system 4 to a pressure feed tank 52. This pressurizes tank 52 and its contents above the reactor pressure, forcing the oily water past check valves 54 and on to the reactor 7 via port 9, where the oily waters become fuel for the reactor 7.

Another stream from the micro hydro cyclone bank 46 can be sent from cyclone discharge 49 to high efficiency recycling molecular membrane osmosis unit 43 and into the unit 43 though an input port 45. Unit 43 can divide the stream into very clean water that leaves the molecular membrane osmosis unit 43 by way of port 44, from which the clean water is delivered to a clean water tank 25.

The remaining stream from the cyclone bank 46, containing additional hydrocarbons, organics, minerals, and sands, can be then pumped forward to join the oily water in reactor pressure feed tank 52 through an input port 55 to the tank 52. It is then fed to the reactor 7, again through port 9, and reactor 7 breaks down remaining hydrocarbons and reacts and oxidizes remaining minerals to form salts and oxide crystals in the reactor 7.

The reaction in reactor 7 creates hot gases that leave the reactor 7 through port 14. The reactor 7 also produces surplus supercritical water that exits the reactor 7 along with any produced oxides or inert compounds via port 26.

Port 26 can deliver supercritical water from the reactor 7 to supercritical water generator system drive column pressure vessels (columns, drive columns, etc.) 27a and 27b, via ports 28 and 29, respectively. Drive columns 27a and 27b can include pressure vessels configured to hold water with a volume of air in a head space above the water in the vessel. Control valves can meter small doses of supercritical water into the drive columns 27a and 27b, where, with reference to the column 27a, the supercritical water explodes to steam in the head space above the water in the column, thus driving the water column down and out through port 32 and from port 32 through a check valve 33 to nozzle 66 on the hydraulic drive generator 38. In this example, column 27b can operate in like manner as column 27a to provide water to the nozzle 66. The hydraulic drive generator 38 can include one or more systems that convert kinetic energy and/or heat of the water received through nozzle 66 into electrical energy. For example, in an embodiment, the hydraulic drive generator 38 can include a direct drive Pelton wheel that is used to drive a generator/alternator 39 that outputs electrical power through a conductor 40.

Again with reference to the drive column 27a, which also applies to column 27b, as the kinetic energy of the water is used to drive the hydro turbine, the drive water falls to a collection launder 41 and from there, by way of gravity or a pump, can be directed into the drive columns 27a to replenish, through port 42, water from the column that was used to drive the generator 39.

As the columns 27a and 27b are refilled with water, the water pushes the remaining steam from the supercritical water supplied at the beginning of the cycle up and out through respective ports 30 and 31, from where it is delivered forward to condenser 19 through an input port 21 on the condenser 19, where the steam is cooled and becomes pure water. The cooled and condensed water can then leave the condenser collection port 22 and flow to pure water tank 25.

In the plurality of hydraulic drive columns 27a, 27b, residual material (e.g., minerals, compounds, and salts, and solids) from the supercritical water oxidation reaction in reactor 7 are transferred with the supercritical water to the columns 27a, 27b. As the supercritical water flashes to steam in the columns 27a, 27b, residual material suspended in the water is released from the steam and precipitates out into the water in the columns 27a, 27b. These elements remain in the water that enters the generator 38 as the water circulates through the hydro turbine 38 until such time as a portion of the water at the bottom of the water column is pulled off when pressure in the column is at its peak. A small side stream drawn from the bottom of the water columns 27a, 27b can be tapped off of port 32 and passed to a molecular membrane unit 34. The cleaned water output from the membrane unit can be passed through a check valve 37 back into the collection launder 41, while the brines, oxides, acids, and inert materials are redirected through port 35 to a collection vat 36.

The system 100 further includes a heat exchanger built into condenser 19 that can heat a glycol loop that is pumped by pump 56 through a precooler 57 and then on to an oil tank heater circuit 59, 60 and returning to the condenser 19 on line 61 through port 24, after passing through the crude tanks 63 to keep them up to temperature. In another embodiment, such a heating circuit, such as the heater circuits 59, 60, may be used to heat water for a community to provide hot water. In some implementations, the precooler 57, or an additional air exchange cooler, may be located at the incoming position (e.g., a port 24) to condenser 19 if temperatures in the tank farm heater circuits 59, 60 are not low enough to cool the condenser.

Figure 2:
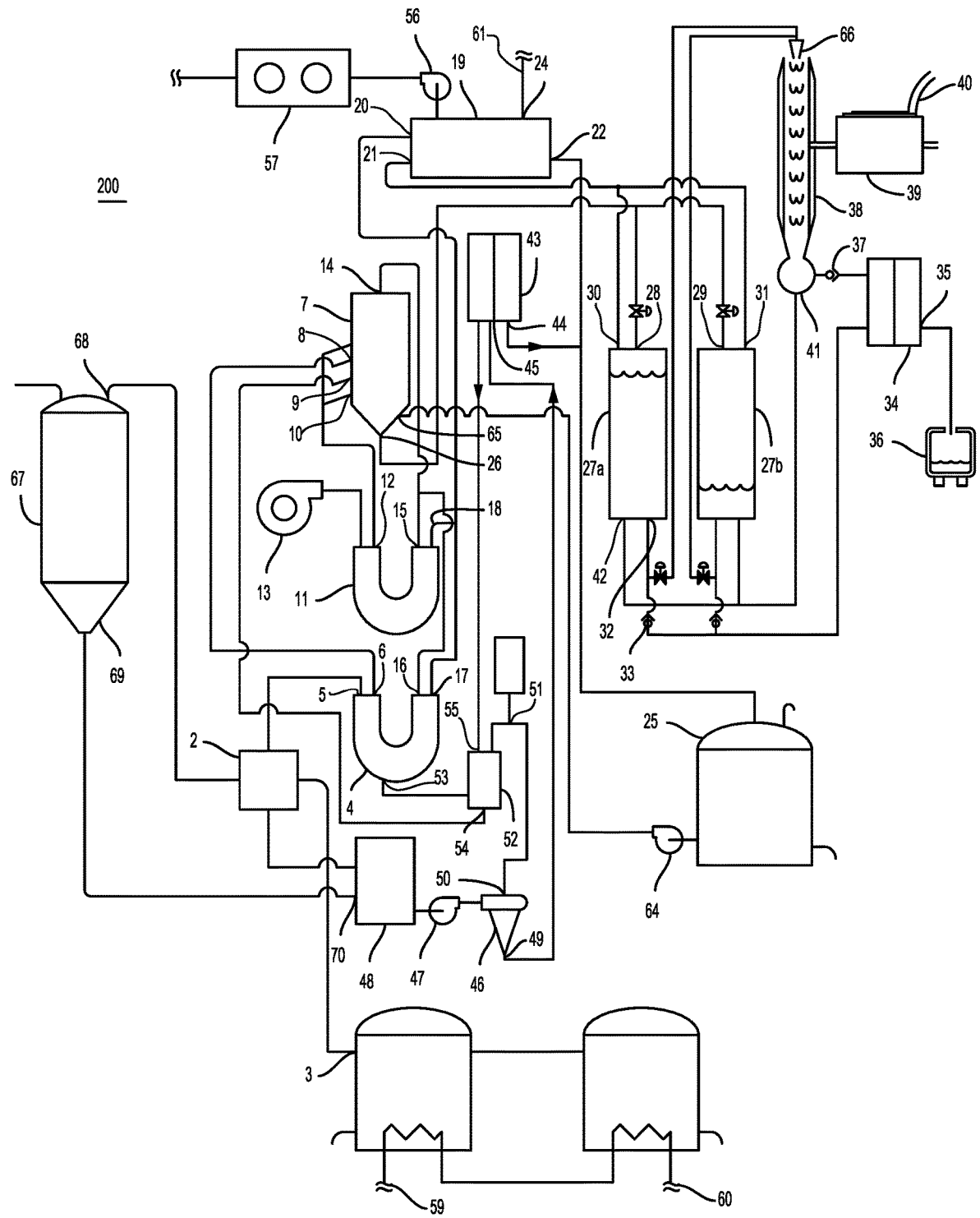
FIG. 2 is a schematic diagram of a supercritical water oxidation reactor system in another embodiment.

FIG. 2 is a schematic diagram of a supercritical water oxidation reactor system 200 in another embodiment. The system 200 is similar to that of FIG. 1, except that the reactor 7 is fueled by biogas and liquid bio or sewage slurry, rather than oil well production water or products.

Thus, in FIG. 2, rather than an oil well riser that provides fuel to the reactor, as in the system 100 shown in FIG. 1, instead, the system 200 includes an anaerobic digestor 67 that provides a source of bio-waste and/or sewage waste that is used as fuel in the reactor 7. Sour biogas can leave the digestor 67 through port 68, which ties into a liquid gas separator 2. Sludge from the digestor 67 can be pumped from port 69 of the digestor 67 into the surge tank 48 through an input port 70 on the tank.

In other embodiments, fuel can be supplied to the reactor 7 in other ways. For example, fuel can be supplied by way of one or more of a hopper, shredder, and/or a feed auger/extruder that feeds shredded fuel, such as waste materials, including plastic, paper, and/or biomaterials (e.g., peanut shells, husks, etc.) in their shredded state directly into reactor pressure feed tank 52.

Figure 3:
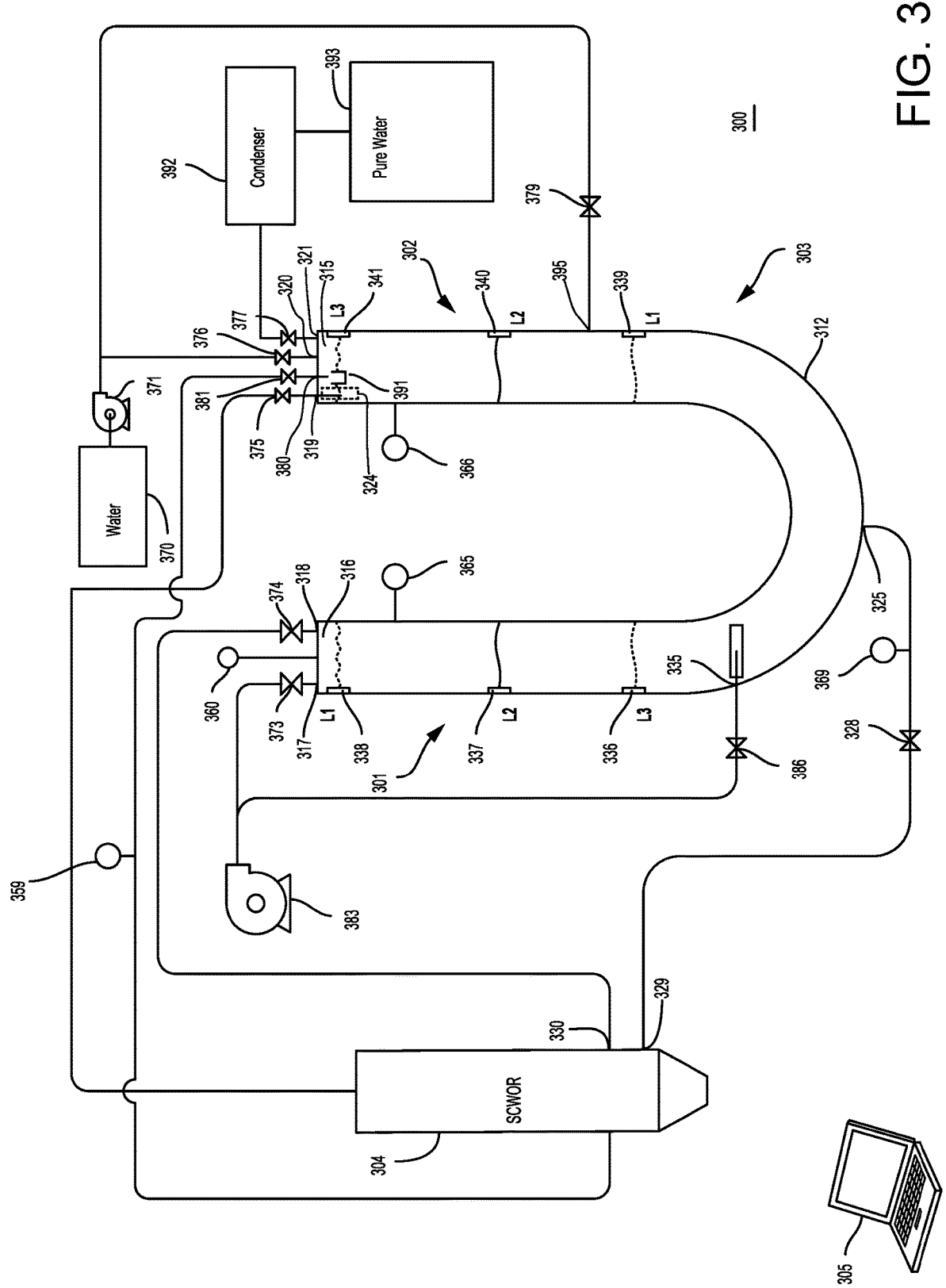
FIG. 3 is a schematic diagram of a system that includes charger system operably coupled to a supercritical water oxidation reactor, in which energy from byproducts of reactions within the reactor are used in the charger system to compress air, fuel, and/or water to pressures exceeding the operating pressure of the reactor for input to the reactor at the high pressures.

FIG. 3 is a schematic diagram of a system 300 that includes charger system 303 operably coupled to a supercritical water oxidation reactor 304, in which energy from byproducts (e.g., heat, steam, hot water) of reactions within the reactor 304 are used in the charger system 303 to compress gases (e.g., air, fuel) and/or water to pressures exceeding the operating pressure of the reactor 304 for input to the reactor at the high pressures. The charger system 303 can compress the gases and liquids without the use of a mechanical piston having a ring that forms a seal against an inner wall of a cylinder. Instead, the charger system 303 can include a vessel that is partially filled with a liquid (e.g., water) and that includes a first gas pocket at a first end of the vessel and a second gas pocket at a second end of the vessel, where the first and second gas pockets are separated by the liquid in the vessel, and where the liquid acts as, or forms a water trap seal, or liquid slug, that provides a seals against the inner wall of the vessel 312 to maintain separation between the first and second gas pockets.

Air and fuel gases for charging the reactor 304 can be introduced into the first gas pocket, and then the second gas pocket can be pressurized using energy from the reactor 304. The pressure in the second gas pocket can be transmitted to the gases in the first gas pocket through movement of the liquid in the water trap. When the pressure of the gases in the first gas pocket is sufficiently high (i.e., is greater than the operating pressure of the reactor 304), high-pressure gas from the first pocket can be released into the reactor. Pressure can be released from the charger system 303 to allow the introduction of a new amount of air and/or fuel gas to be introduced to the first gas pocket of the charger system 303. For example, low temperature water (e.g., in the form of a mist) can be used to cool gas and liquids in the second air pocket to reduce the temperature of the gas and liquids, and then the gas can be vented or released from the second air pocket to a condenser. When the pressure in the second air pocket decreases, a vacuum is created, which draws the water in the vessel toward the second air pocket, thus creating additional volume in the first air pocket for the introduction of new air and/or fuel gases to be introduced to the first air pocket for compression in a subsequent cycle.

In an implementation, the vessel of the charger system 303 can include a hollow U-shaped pressure vessel 312 having two ends 315, 316. The pressure vessel 312 can include one or more walls that define a hollow interior cavity that is configured to be partially filled with water, with a gas pocket on each side of the water. In an implementation, the vessel 312 can include a single cylindrical casting. In another implementation, the vessel can include two straight pipe spools that are connected with two 90-degree spools, as a welded pipe assembly. The vessel 312 can be made of material capable of withstanding high pressure, for example, stainless steel, carbon fiber, copper, or ceramic material. The material and wall thickness of the casting or welded spools of the vessel 312 are such that the vessel 312 can withstand the maximum pressure expected plus a safety margin or safety factor. The inner wall surface of the vessel 312 may include a non-corrosive steel or composite material or the interior can be lined with a non-corrosive material that can handle the design temperatures. The tops of the U-shaped pressure vessel 312 can be enclosed by a blind flange arrangement or by high-pressure bolts on cylindrical head(s) located at ends 315 and 316. In some implementations, hemispherical pressure heads may be used, rather than high pressure blind flanges and/or high-pressure bolts.

The vessel 312 can be partially filled with liquid (e.g., water). With a U-shaped vessel 312 oriented in a vertical position with the ends 315, 316 located in the tops of first and second straight legs, respectively, located above, with respect to a direction of gravity, the curved portion of the vessel, the liquid in the vessel 312 can act as a sealing trap, or liquid slug, between a first gas pocket located at a first end 316 of the vessel and a second gas pocket located at a second end 315 of the vessel.

As shown in FIG. 3, the liquid in the vessel is in an equilibrium position in which water reaches level L2 in a first side 301 of the vessel and reaches a level L2 and a second side 302 of the vessel. During operation of the system 300, the water levels inside the vessel 312 rise and fall as the water inside the vessel moves back and forth between the first side 301 and the second side 302 in response to increasing and decreasing pressures in the first and second air pockets located at ends 315, 316 of the vessel. For example, under a high pressure in the air pocket in the first end 316 and a low pressure in the air pocket at the second end 315, the water can move to a level L3 in the first side 301 and to a level L3 in the second side 302, and under a low pressure in the air pocket in the first end 316 and a high pressure in the air pocket at the second end 315, the water can move to a level L1 in the first side 301 and to a level L1 in the second side 302.

Vessel 312 can include gas ports (e.g., a low-pressure inlet port 317 and a high-pressure outlet port 318) located in vessel end 316 and gas ports (e.g., a high-pressure gas inlet port 319, a gas outlet port 321) and a high-pressure, high-temperature liquid inlet port 395 located in vessel end 315. The vessel also contains a low-temperature liquid inlet port 320 located in vessel end 315, and a liquid port 395 located in a side of the vessel between the vessel end 315 and the U-shaped portion of the vessel, and a liquid port 325 located in the U-shaped portion of the vessel.

An additional liquid port 335 can be included in the first side 301 of the vessel 312 below a lowest liquid level L3 under first end 316. An additional liquid port 395 can be included in the second side 302 of the vessel, for example, located below an equilibrium level L2 of the water in the second side 302 of the vessel. The charger system 303 can include liquid level sensors 338, 337, and 336 positioned on or within vessel 312 to sense when the liquid level in the first side 301 of the vessel is at levels L1, L2, and L3, respectively, below vessel end 316. Similarly, the charger system 303 can include liquid level sensors 339, 340, and 341 positioned on or within vessel 312 to sense when the liquid level in the second side 302 of the vessel is at levels L1, L2, and L3, respectively, below vessel end 315.

Signals from the sensors 336, 337, 338, 339, 340, and 341 can be provided to a controller 305 that controls the operation of the system 300, for example, through opening and closing of valves in the system. Sensors 338 and 341 transmit signals indicating a maximum fluid level at the respective vessel ends of the vessel at which the sensors 338 and 341 are located. Sensors 336 and 339 transmit minimum fluid level information for their respective vessel legs. Sensors 337 and 340 transmit return to equilibrium liquid level information.

The liquid in vessel 312 can absorb heat from the gases received from the reactor 304 gases through port 319 and distributed by the sparger 324 and gives up, or transfers heat to gas and liquid in the vessel 312. Liquid is cycled through vessel 312 at an optimized rate to maintain an optimized temperature to absorb a significant portion of the waste exhaust heat arriving into the vessel 312 via sparger 324.

A pressure transducer 360 can be located at the first end 316 of the vessel 312 to measure pressure of gasses in the first gas pocket at the first end 316 of the vessel. Thermometer (e.g., thermocouples) can be located in thermal wells 365 and 366 of the first side 301 and second side 302, respectively, of the U-shaped vessel 312 to measure temperature in vessel 312's ends 316 and 315, respectively, above an equilibrium level L2 of the water in each side of the vessel. The temperature of the liquid in the vessel also can be measured, for example, by temperature transmitter 369 at liquid port 325 in the U-shaped portion of the vessel that is below the minimum liquid level L3 of the liquid in the first side 301 of the vessel and below the minimum liquid level L1 of the liquid in the second side 302 of the vessel.

A control valve 373 (e.g., a solenoid valve, a check valve, or other automated value) can be operated to supply air to the first air pocket at the first end 316 of the vessel 312 through port 317. In some implementations, the air can be supplied at atmospheric pressure through port 317. In some implementations, a blower 383 can supply air at a pressure higher than atmospheric pressure through port 317 to the first air pocket at the first and 316 of the vessel 312.

In another embodiment, air from blower 383 can be directed into vessel 312 through port 335 by opening a control valve 386 (e.g., a solenoid valve, a check valve, or other automated value). Control valve 374 (e.g., a solenoid valve, a check valve, or other automated value) can be opened/closed to control the flow of pressurized gases from the first air pocket near first end 316 of the vessel out of port 318 and into the reactor 304, and can be controlled to block the pressurized, charge air from leaving the first end 316 of the vessel 312 until the gas reaches a pressure greater than the pressure inside of the reactor 304, and conversely prevents high pressure fluids from returning from reactor 304 while the pressure in vessel 312 is below the operating pressure of the reactor 304.

The pressure of the air trapped in the first air pocket near the first end 316 of vessel 312 can be increased by the liquid level in the first side 301 of the vessel 312 rising from level L3 or L2 to L1. This change in liquid level can be driven by increasing the pressure of the second air pocket at the second end 315 of the vessel. For example, opening a control valve 375 (e.g., a solenoid valve, a check valve, or other automated value) connected between the reactor 304 and a port 319 at the second end 315 of the vessel can allow high-pressure gases from the reactor 304 into the second air pocket in the vessel 312, thus increasing the pressure in the second air pocket and forcing the water in the vessel down in the second side 302 of the vessel and up in the first side 301. In an implementation, the hot gases from the reactor 304 can be injected through port 319 and out of a sparger 324 located within the vessel 312 at an end of a conduit that passes through the port 319. The sparger 324 may include a metal or ceramic cylinder, with one or more openings at the end of the cylinder and one or more openings in the round wall of the cylinder through which steam escapes from the conduit into the air pocket at the second end 315 of the vessel. The sparger 324 may be located, such that it is at least partially below liquid level L3 on the second side 302 of the vessel, such that when the liquid level is at L3, steam from the sparger 324 is emitted into the liquid and also into the air pocket above the liquid level.

When the hot gasses are received through port 319 and are emitted from the sparger 324, they can bubble through the liquid and move to the head space of the second air pocket at the second end 315 of the vessel 312, thus forcing the liquid down in the second side 302 of the vessel 312, and up in the first side 301 of the vessel 312. This movement of the liquid increases the pressure of the gas in the first air pocket in the head space at the first end 316 of the vessel 312, thereby preparing the gas to be to be delivered to the reactor 304 from the first end 316 of the vessel. The action of bubbling the gases through the sparger 324 can lower the temperature of the hot gases and transfer heat to the liquid in the vessel.

Pressure in the second air pocket at the second end 316 of the vessel can also be increased by the introduction of hot water (e.g., supercritical water) received from the reactor through port 380 by opening a control valve 381 (e.g., a solenoid valve, a check valve, or other automated value) in a conduit between the reactor 304 and the port 380. The hot water can be injected into a metal or ceramic cup or bowl 391 located within the vessel 312 at the second end 315 of the vessel, so that the water flashes to steam in the second air pocket at the second end 315 of the vessel 312 and increasing the pressure in the vessel. A conduit that supplies hot water (e.g., supercritical water) from the reactor to the charging system 303, and other conduits in the system 300, can be made of, or lined with, a non-reactive material (e.g., ceramic, PTFE, stainless steel, etc.) to mitigate corrosion by the water. Additionally, one or more oxygen sensors 359 in the system 300 can monitor an amount of oxygen in water or vapor flowing through one or more conduits and/or in the reactor 304, and the reaction in the reactor 304 can be controlled to maintain a measured oxygen amount below a predetermined threshold value to mitigate corrosion within the conduits and/or valves connected to the conduits.

In an implementation, when a pressure of the air pocket at the first end 316 of the vessel (e.g., as measured by a pressure transducer 360) exceeds a first threshold value (e.g., equal to the operating pressure of the reactor 304), then valve 375 can close to block gases from transmission between the reactor 304 and the second air pocket at the second end 315 of the vessel through port 319, and a control valve 376 (e.g., a solenoid valve, a check valve, or other automated value) can open to admit a momentary spray of water pumped by pump 371 from a water reservoir 370 through port 320 into the second end 315 of the vessel. The spray of water can be introduced as a mist into the hot gases at the second end 315, such that droplets of the mist expand to steam, thus increasing the pressure in the second end 315.

In addition, control valve 379 (e.g., a solenoid valve, a check valve, or other automated value) can be opened to pass high pressure water through the port 395 into the second side 302 of the vessel 312, further pressurizing the charge air in the first air pocket at first end 316. When the pressure transducer 360 detects that the pressure in vessel 312 exceeds a second threshold value (e.g., a pressure greater than the pressure in reactor vessel 304 by a preset amount, typically more than 50 psi), control valve 374 (e.g., a solenoid valve, a check valve, or other automated value) can be opened to transmit the charge air from the first air pocket through port 318 and into the reactor 304 through port 330.

To ensure that a desired amount of water remains in the vessel 312 and in the reactor 304 and to extract heat from vessel 312, on a cyclic or as needed basis, when the pressure transducer 360 detects that the pressure in vessel 312 has fallen below a third threshold value (e.g., a pressure slightly above the pressure in reactor 304, e.g., 10 to 50 psi higher than the operating pressure of the reactor 304) or when a water level sensor 338 detects that the liquid level in the first side 301 of the vessel has reached a maximum level L1, valve 374 can be closed, and control valve 328 (e.g., a solenoid valve, a check valve, or other automated value) can be opened to allow liquid to pass out of a port 325 in vessel 312 and through a port 329 into the reactor vessel 304. Valve 328 can be closed when sufficient water has been pumped into the reactor. To prevent the liquid slug level from becoming too low, valve 328 can be closed when the liquid level under head space in the second side 302 of the vessel drops below a lower level L1 at sensor 339, at which point valve 376 can open to allow water to be pumped from reservoir 370 and sprayed into the second air pocket at the second end 315 of the vessel 312 until a metered amount of water is injected into the vessel. Once a water level in the vessel exceeds a minimum threshold level such as detection at level sensor 339 or the measured amount of water introduced (e.g., as indicated by a number of revolutions of a fixed displacement pump, such as the pump 371), valve 328 can be closed, and valve 376 can be closed, so that water neither enters nor exits the vessel 312. Then, valve 373 can be opened and valve 377 can be opened to vent steam and pressure from the second air pocket at the second end 315 through port 321 to a condenser 392 where water vapor is condensed and then routed to a storage tank 393. With valve 373 open, new charge air or gaseous fuel, pushed in by the blower 383, can enter the head space in the first air pocket at the first end 316 of the vessel, and pushing the water level down on the first side 301 of the vessel and up on the second side 302 of the vessel, thus pushing the remaining reactor gas (now cooled) and steam from the second air pocket out through port 321 and into condenser 392.

When the water level in the second side 302 of the vessel reaches L3 (e.g., as determined by water level sensor 341), valve 377 can be closed, and, shortly thereafter, valve 373 can be closed. At this point, the vessel 312 of the charging system 303 is prepared to cycle through another charge of air again, beginning with the opening of valve 375 to admit hot gasses from the reactor into the second air pocket at the second end of the vessel through port 319.

Valves of the system 300 (e.g., valves 373, 374, 375, 376, 377, 379, 381, 386, 328) can be operated under computer control by the controller 305. The controller can include one or more memory devices storing computer readable instructions and one or more processors configured for executing the instructions. The instructions may be executed to programmatically control operation of the system 300. For example, the timing of the opening and closing of the valves of the system 300 can be controlled such that the water in the vessel 312 cycles back and forth between a first state having a level L3 in the first and second ends 316, 315 of the vessel 312 in which charge gas is loaded into the first air pocket at the first end 316 of the vessel, and a second state having a level L1 in the first and second ends of the vessel, in which the charge gas is compressed to a pressure higher than the operating pressure of the reactor 304. Thus, the charger system 303 can operate in a two-stroke cycle, in which gas is loaded into the first air pocket in a first stroke of the water movement within the vessel 312 and then that gas is compressed in a second stroke of the water movement. The movement of the slug of water within the vessel 312 can have a natural oscillation frequency that can depend on physical parameters, including, for example, the mass of the water. In some implementations, the timing of the opening and closing of the valves can be selected such that the water in the vessel 312 is pushed back and forth within the vessel between its first state and its second state at a frequency that matches, or is close to (e.g., within about 10%), the natural oscillation frequency of the water in the vessel.

Although the configuration of the charger system 303 has been described herein primarily in the context of a U-shaped vessel, other configurations of a charger system having first and second air pockets separated by a water slug that couples pressure in one air pocket to another are also possible.

Figure 4:
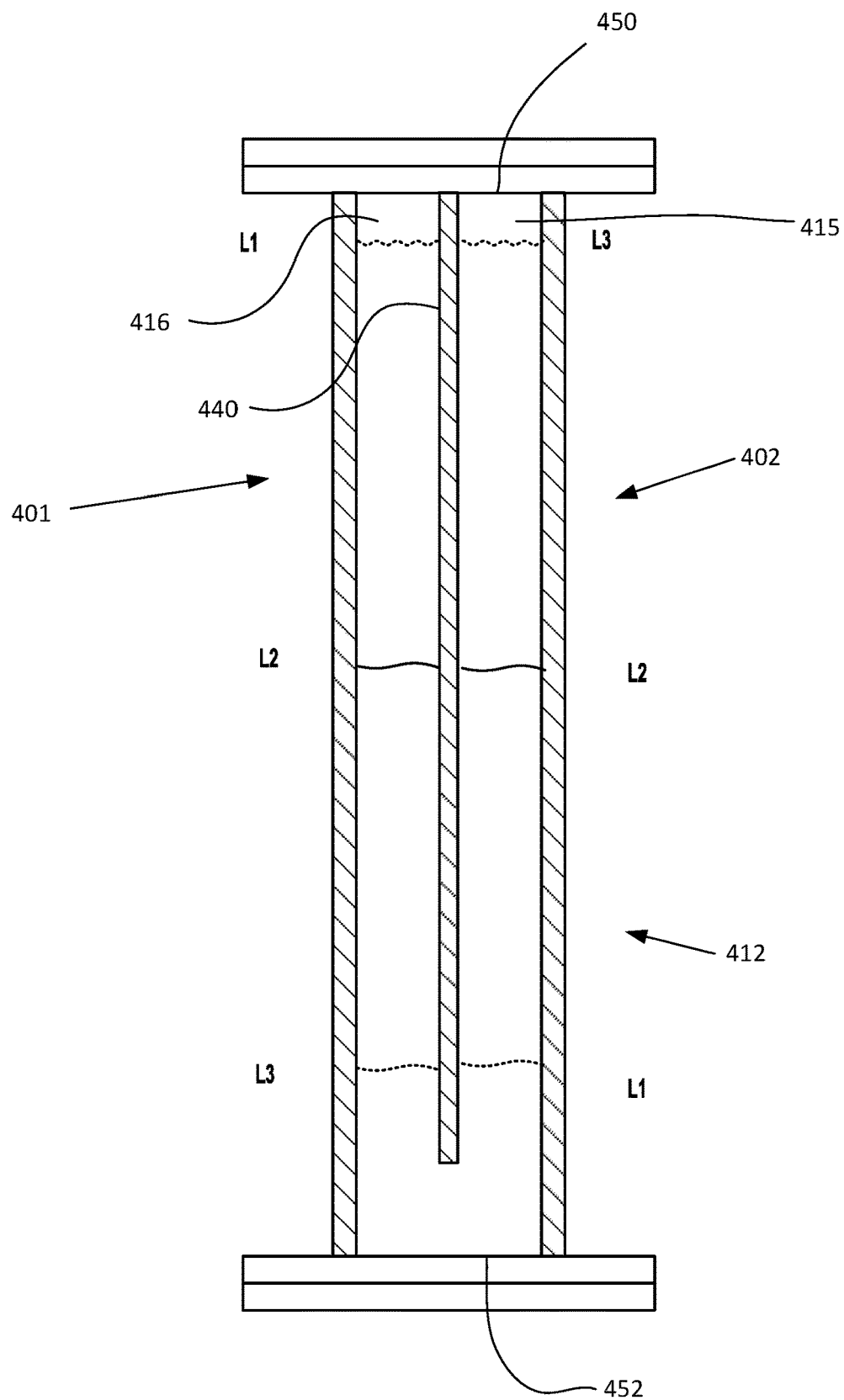
FIG. 4 is a schematic diagram of a vessel that can be used in a charger system.

For example, FIG. 4 is a schematic diagram of a vessel 412 that can be used in a charger system. The vessel 412 can include a right cylindrical cavity, for example, fabricated from a single spool of pipe, with a platen 440 that separates a first side 401 of the vessel from a second side 402 of the vessel, where the platen 440 extends from a top 450 of the vessel downward into a hollow interior cavity of the vessel but not all the way to the bottom 452 of the vessel.

Water can partially fill the interior cavity of the vessel 412 and can move back and forth two different sides of the platen 440 between a first state in which water is at levels L3 on the left and right sides 401, 402 of the vessel 412 and a second state in which water is a levels L1 on the first and second sides of the vessel. Charge gas can be loaded into a first air pocket at the first end 416 of the vessel when the water is in the first state and can be compressed to a high-pressure when the water is forced into the second state be the introduction of energy from the reactor into a second air pocket at the second end 415 of the vessel.

Other configurations of a vessel for use in the charging system 303 are also possible. For example, first and second chambers can be coupled by a tube or pipe, with water being loaded into the tube or pipe to create a transmission mechanism for transferring pressure from one chamber to the other. For example, the first chamber can be used to load charge gases, and the second chamber can be used to receive high-pressure gas for liquid from a reactor, thus increasing the pressure of the second chamber, which then transmits the increased pressure through the water in the connecting tube or pipe to the first chamber.

Figure 5:
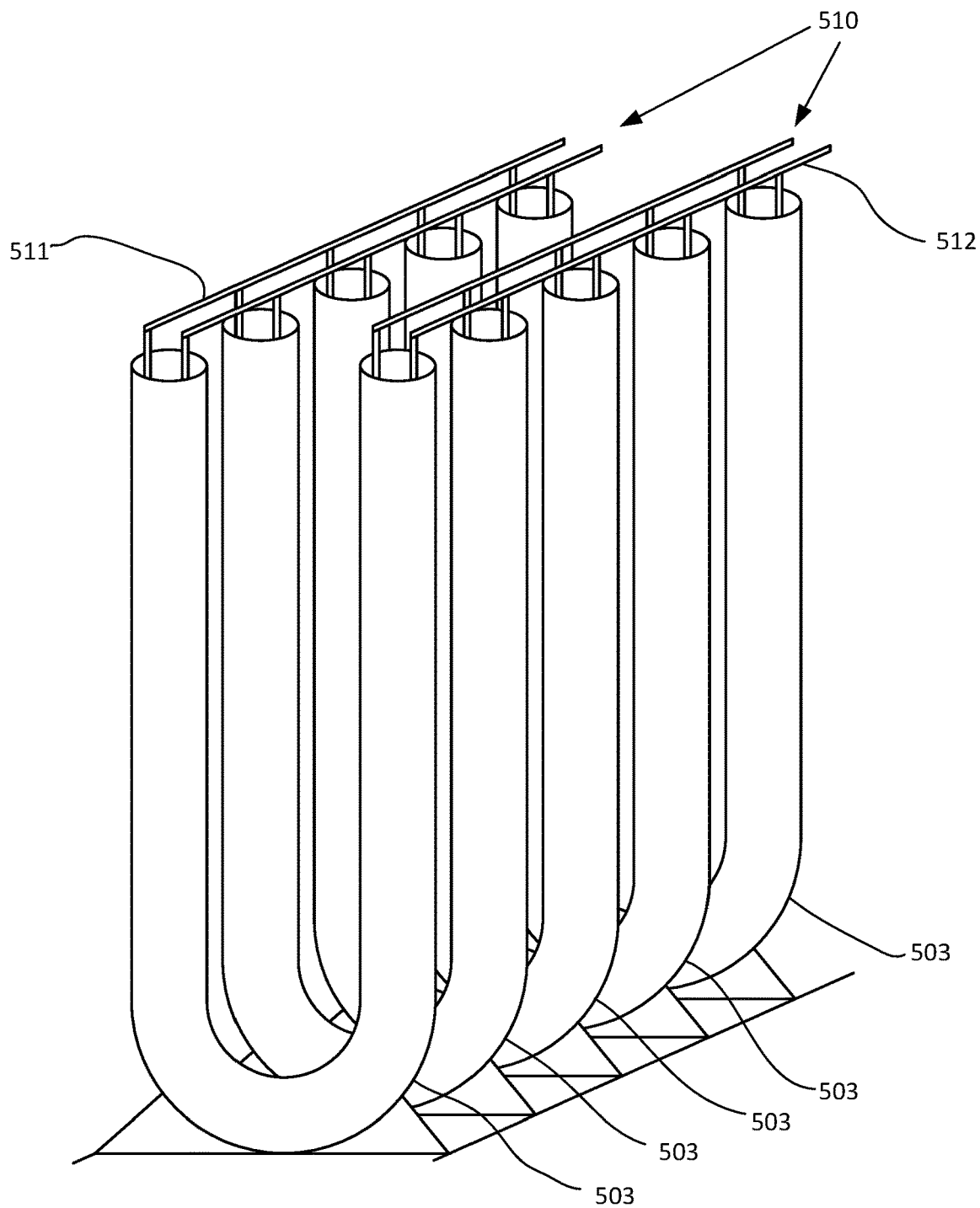
FIG. 5 is a schematic diagram of a plurality of charging systems connected in parallel for use in compressing gas for use in a reactor.

FIG. 5 is a schematic diagram of system 500 including a plurality of charging systems 503 connected in parallel for use in compressing gas for use in a reactor. The plurality of charging systems can be coupled by a manifold 510 where first side 511 of the manifold supplies low pressure charge gas and/or fuel gas to the plurality of charging systems 503 to be compressed before being fed to a reactor, and a second side 512 of the manifold 510 supplies high pressure gas and/or water from the reactor that is used to pressurize the charge gas or fuel gas. The supply of low-pressure charge gas and/or fuel gas and high-pressure gas and/or water to each of the plurality of charging systems can be controlled independently, such that the high-pressure charge gas can be delivered from different charging systems to the reactor at different times. This can dampen motion of the assembly of the different charging systems, for example, by reducing a range of motion of a center of mass of the system as the water in the different charging systems 503 moves back and forth. In addition, it can smooth temperature and/or pressure variations in various parts of the entire system, including, for example, the reactor, and in individual charging systems 503.

Figure 6:
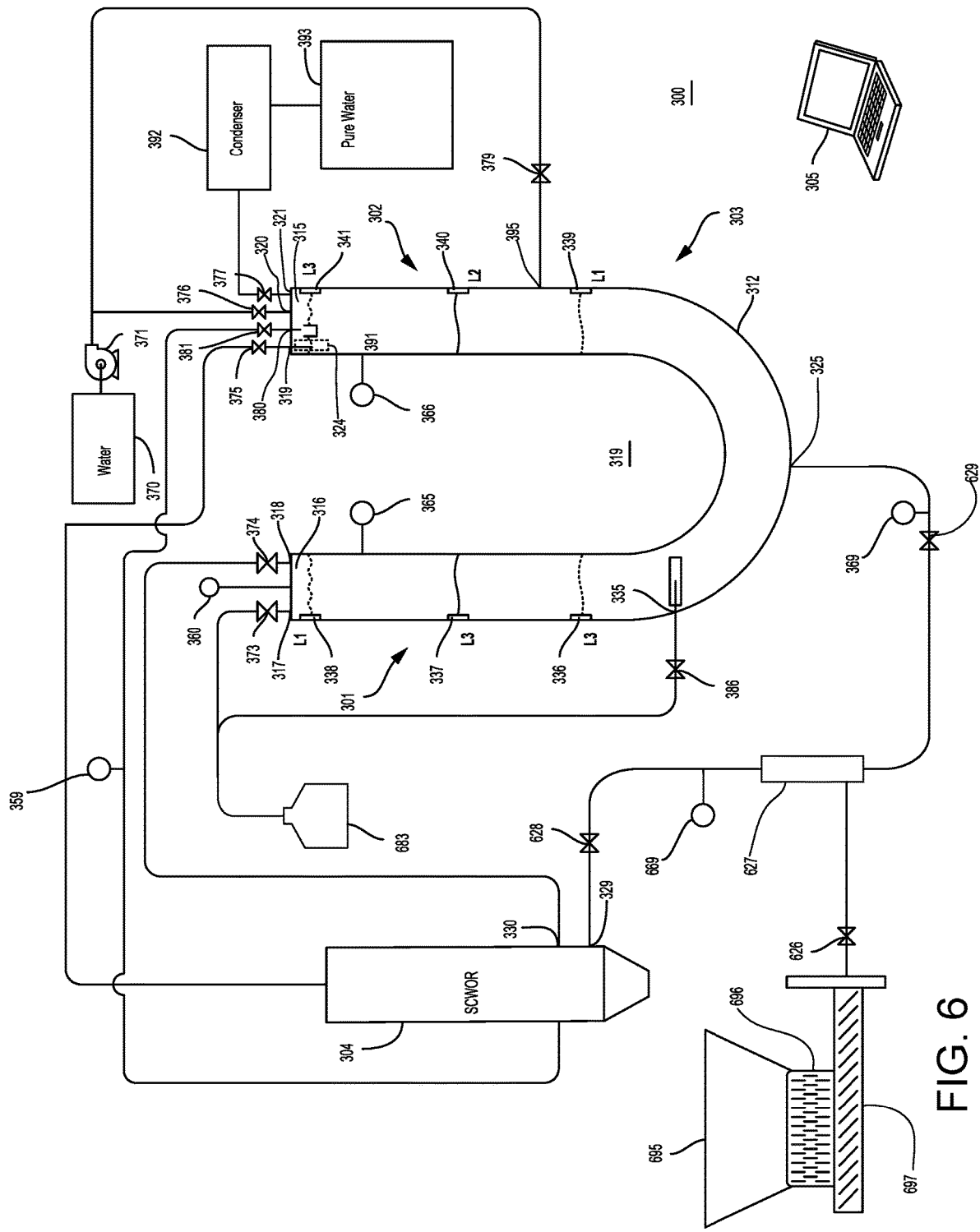
FIG. 6 is a schematic diagram of another implementation of a charger system, in which the charger system is used to compress fuel gas, liquid fuel, and/or solid fuel to pressures exceeding the operating pressure of the reactor for input to the reactor at the high pressures.

FIG. 6 is a schematic diagram of another implementation of the system 300, in which the charger system 303 is used to compress fuel gas (e.g., natural gas, sour gas, biogas, or other fuel gases), liquid fuel, and/or solid fuel to pressures exceeding the operating pressure of the reactor for input to the reactor at the high pressures.

As shown in FIG. 6, a fuel gas source 683 can be operably connected to the first air pocket at the first end 316 of the charger system 303 through a conduit that runs from the fuel gas source 683 to port 317. The gas source can be any source of fuel gas, including, for example, a tank of gas, a gas line (e.g., from an oil well, or other production facility), etc. Fuel gas can be supplied from the fuel gas source 683 to the first air pocket through the port 317, and the supply of the fuel gas can be controlled by control valve 373. In an implementation, the fuel gas can be supplied from the fuel gas source 683 at a pressure greater than atmospheric pressure and/or at a pressure greater than a predetermine pressure that is experienced by the first air pocket at the first end 316 of the charger at some time during a cycle of the liquid slug in the vessel 312. The value 373 can include a check valve that opens when a predetermined pressure differential exists between a pressure of the fuel gas source on one side of the valve and a pressure of the first gas pocket on another side of the valve. In another implementation, the valve 373 can include a solenoid valve that is opened and closed by an electrical current (e.g., supplied by controller 305).

In another implementation, fuel gas can be supplied from fuel gas source 683 to within a first side 301 of the vessel 312 at a location that is below a level of the liquid slug or at a location that is below a level of the or liquid slug at least some time during a cycle of the liquid slug. For example, fuel gas can be supplied under control of a valve 386 through a port 335 into a first side 301 of the vessel and into the liquid plug, and bubbles of fuel gas can rise to the first air pocket at the first end 316 of the vessel for compression and then injection into the reactor 304.

In another implementation, liquid fuel and/or solid fuel suspended in a liquid from a fuel supply 695 can be injected into the reactor 304 by pressurized liquid from the charging system 303. The fuel supply 695 may provide fuel in the form of a sludge or slurry, which may include various forms of reactable liquids or solids, including, for example, shredded or blended garbage, wood pulp, sewage sludge, ground kelp, grass, hay, slurried peanut or soybean shells, crude oil, tank bottoms, animal renderings, and many more potential solid or liquid fuels for use in the reactor 304. The fuel supply 695 may include a shredder 696 configured to break down solid materials and an auger 697 configured to transport materials from the supply 695 to a slurry chamber 627. In another embodiment, the fuel supply may include a port configured for pumping a sludge or liquid fuel from the supply 695 to the slurry chamber 627.

To load fuel from the slurry chamber 627 into the reactor 304, in an example implementation, when pressure transducer 360 sends a signal indicating that the pressure in the vessel 312 exceeds a threshold pressure (e.g., a pressure greater than the operating pressure of the reactor 304 equal or when the liquid level sensor 338 detects that the level of the liquid slug has reached a threshold level in the first side of the vessel 312, valve 374 can be closed and then, with valve 626 closed, control valves 628 and 629 can be opened. In this state, liquid from the liquid slug in the vessel 312 can pass through port 325 and, from there, into and through the slurry loading chamber 627 that contains liquid and/or solid fuel, and from thence into the reactor 304 to deliver a paste, slurry, or liquid fuel to the reactor 304. Following a metered amount of paste flush (e.g., as measured by a flow meter 669 or as determined based on valves 628 and 629 being open for a predetermined time), valve 628 is closed.

With valve 628 closed, liquid and/or solid fuel can be loaded from the fuel supply 695 into the slurry chamber 627. For example, after fuel gas from supply 683 is loaded into the first air pocket at the first end 316 of the vessel 312 while the level of the liquid slug in the first side 301 of the vessel falls, then when the level of the liquid slug in the first side 301 of the vessel is below the level of sensor 337 at an equilibrium level L2 of the liquid slug, control valve 373 can close, thus shutting off the flow of fuel gas. With valve 377 open, valve 626 in a conduit between fuel supply 695 and slurry chamber 627 can be opened and with valve 629 open, pressurized slurry, sludge, or hydrocarbon liquid can be pumped into the slurry loading chamber 627. When the predetermined sludge charge is completed, valve 626 can be closed, followed by the closing of valve 629 closing next. With the closure of valve 377, the charging system 303 is then ready to be brought up to pressure by the introduction of energy from the reactor 304 into the second air pocket at the second end 315 of the vessel 312 and to repeat the cycle of loading fuel from the slurry chamber 627 into the reactor 304.

In a system 300 that includes a plurality of charging systems 303 that supply materials to the reactor 304, different system 303 can be used to compress and load different materials into the reactor 304. For example, one or more charging systems 303 can be used to compress and load oxygenated air into the reactor 304, while different charging systems 303 of the plurality can be used to compress and load fuel gas into the reactor 304, and while additional different charging systems 303 of the plurality can be used to compress and load solid or liquid fuel into the reactor 304.

In some implementations, the cycle time in which air and or fuel gas is compressed and loaded into the reactor can be shorter than the loading time to supply liquid and/or solid fuel from the supply 695 to the slurry chamber 627. In such a case, the slurry chamber 627 may be loaded during a time period, $T_1$, during which a pressure in the vessel 312 is relatively low, for example, when control valve 377 between the second air pocket at the second end 315 of the vessel 312 and the condenser 392 is open and valves 374, 375 between the vessel 312 and the reactor 304 are closed and valve 376 between the high-pressure liquid pump 371 and the vessel 312 is closed. However, this time period may be longer than a time period, $T_2$, during which air or fuel gas is supplied to the first air pocket at the first end 316 of the vessel 312. For example, $T_1$ can be more than 100 times longer than $T_2$. Thus, in a charging system 303 that is used to provide liquid and/or solid fuel (e.g., from a slurry chamber 627) to a high-pressure reactor using energy provided by the reactor, the charging system 303 may operate with a cycle time in which gas is provided to the first gas pocket of the vessel 312 during a first stroke of the cycle and energy from the reactor is provided to the second gas pocket of the vessel 312 during a second stroke of the cycle, but that cycle may be paused to allow for the loading of the slurry chamber while the slurry chamber is under relatively low pressure.

In another implementation, the system 300 can include a plurality of charging systems 303, where each of the plurality of charging systems 303 can have different capacities and dimensions that are selected based on the material that they are configured to provide to the reactor 304. For example, if a loading time for a first charging system that supplies solid material to the reactor is greater than a loading time for a second charging system that supplies gaseous material to the reactor, the dimensions of the first charging system may be selected such that a natural frequency of the liquid slug in the first charging system is lower than a natural frequency of the liquid slug in the second charging system to permit more time to load the solid and/or liquid material that is needed to load the gaseous material.

FIG. 7 is a flowchart illustrating a method 700 of charging a reactor with charge gas using energy from the reactor. In example implementations, the method 700 can be implemented using apparatus described herein, such as illustrated in FIGS. 1-6 and described above. For instance, the method 700 can be implemented using a vessel (e.g., U-shaped vessel, such as the charger system 4, or the charger system 11 in FIG. 1) having one or more walls that define a hollow interior cavity, where the hollow inner cavity is partially filled with a liquid slug. In implementing the method 700, a first air pocket can be disposed within the cavity on a first side of the liquid slug, and a second air pocket can be disposed within the cavity on a second side of the liquid slug.

As shown in FIG. 7, at block 710, the method 700 includes drawing charge gas into the first air pocket through a port connected to the first air pocket by dropping a level of the liquid slug below the first air pocket and raising a level of the liquid slug below the second air pocket. In this example, the liquid slug can form a water trap seal against the one or more walls of the vessel that that define the hollow interior cavity between the first and second air pockets. At block 720, the method 700 includes receiving high-pressure gas from a reactor into the second air pocket. Receiving the high-pressure gas from a reactor into the second air pocket can lower a level of the liquid slug below the second air pocket and raise a level of the liquid slug below the first air pocket, which can compress a volume of the drawn-in charge gas in the first air pocket.

At block 730, the method 700 further includes injecting high-pressure water into the second air pocket, where the second air pocket has a temperature that causes the injected water to vaporize. At block 740, the method 700 includes injecting the pressurized drawn-in charge gas from the first air pocket into the reactor. The pressurized drawn-in charge gas from the first air pocket can be injected into the reactor when a pressure of the first air pocket exceeds an operating pressure of the reactor.

Example implementations of the method 700 can include one or more of the following features. For example, the method 700 can include injecting liquid from the liquid slug into the reactor when the pressure of the liquid slug exceeds the operating pressure of the reactor. The method 700 can include injecting the liquid from the liquid slug into a chamber configured for containing fuel for combustion in the reactor. The chamber can be coupled to the high-pressure liquid outlet port of the vessel and can be coupled to the reactor. The method can include mixing the released liquid with the fuel; and delivering a mixture of the fuel and the released liquid to the reactor.

The injected high-pressure water can have a pressure that exceeds the operating pressure of the reactor. The injected high-pressure water can have a temperature that is lower than a temperature of the second air pocket.

The method can include releasing gas from the second air pocket to a condenser after the level of the liquid slug is lowered below the second air pocket. The method can include performing the operations of block 710, 720, 730 and 740, such that the liquid slug cycles within in the cavity with an oscillation frequency. The oscillation frequency can be within 10% of a natural oscillation frequency of the liquid slug in the cavity. The charge gas can include air. The charge gas can include fuel gas for combustion in the reactor.

The techniques described herein have significant advantages. They facilitate charging a supercritical water oxidation reactor with fuel and oxygen using waste heat and energy from the supercritical water oxidation reaction, and the enable pressurization of gases to very high pressures without any moving mechanical pistons inside of cylinders, thus greatly reducing wear and maintenance normally associated with these types of fuels. Furthermore, they allow allows dirty bio and hydrocarbon fuels as well as dirty water to be used in super critical water oxidation processes, thus dramatically improving the range of selectable fuels and water sources, many of them as low-cost renewable sources or from waste such as sewage or contaminated sea water. Further the ability to charge the reactor with these fuels and liquids using waste pressure and heat left over from the reaction makes the entire process more efficient and economically viable. This in turn opens possibilities to less expensive and more environmentally friendly energy production and water reclamation.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A charging system for charging a reactor with gas, using energy produced by the reactor, the charging system comprising:
    an oxidation reactor configured for reacting fuel;
    a vessel having one or more walls that define a hollow interior cavity configured to be partially filled with a liquid slug, a first air pocket within the hollow interior cavity on a first side of the liquid slug, and a second air pocket within the hollow interior cavity on a second side of the liquid slug, wherein the liquid slug forms a water trap seal against the one or more walls that define the hollow interior cavity between the first and second air pockets;
    a plurality of valves configured to control admission of charge gas into the first air pocket at a pressure lower than an operating pressure of the oxidation reactor and to extract charge gas from the first air pocket at a pressure higher than the operating pressure of the oxidation reactor and to control the admission of gas from the oxidation reactor into the second air pocket and to control a release of gas from the second air pocket; and
    a controller configured to control the operation of one or more of the plurality of valves to cause the liquid slug to move within the vessel in a cycle in which charge gas is loaded into the first air pocket in a first stroke of the liquid slug and gas in the first air pocket is compressed in a second stroke of the liquid slug, wherein movement of the liquid slug during the second stroke is caused by an increasing pressure in the second air pocket due at least in part to introduction of gas from the oxidation reactor into the second air pocket, and wherein the movement of the liquid slug during the first stroke is caused by a decreasing pressure in the second air pocket due at least in part to the release of gas from the second air pocket.

2. The charging system of claim 1, further comprising:
    a first air inlet port configured to admit charge gas into the first air pocket, wherein the plurality of valves includes a first valve configured to control the admission of charge gas through the first air inlet port into the first air pocket;
    a first air outlet port configured to extract charge gas from the first air pocket for injection into the oxidation reactor when a pressure in the first air pocket exceeds an operating pressure of the oxidation reactor by a first threshold, wherein the plurality of valves includes a second valve configured to control the extraction of charge gas from the first air pocket into the oxidation reactor;
    a second gas inlet port configured to receive gas from the oxidation reactor into the second air pocket, wherein the plurality of valves includes a third valve configured to control the admission of the gas through the second gas inlet port into the second air pocket;
    a second gas outlet port configured to release gasses from the second air pocket, wherein the plurality of valves includes a fourth valve configured to control the extraction of gasses from the second air pocket through the second gas outlet port.

3. The charging system of claim 2, further comprising:
    a first liquid inlet port configured to admit liquid from the oxidation reactor into the second air pocket, wherein the plurality of valves includes a fifth valve configured to control the admission of liquid through the first liquid inlet port into the second air pocket,
    wherein movement of the liquid slug during the second stroke is caused by an increasing pressure in the second air pocket due at least in part to the admission of the liquid through the first liquid inlet port into the second air pocket when the admitted liquid vaporizes within the second air pocket.

4. The charging system of claim 2, further comprising:
    a second liquid inlet port configured to admit liquid as a mist into the second air pocket, wherein the plurality of valves includes a sixth valve configured to control the admission of liquid through the second liquid inlet port into the second air pocket,
    wherein movement of the liquid slug during the second stroke is caused by an increasing pressure in the second air pocket due at least in part to the admission of the liquid through the second liquid inlet port into the second air pocket when the mist expands to steam in the second air pocket.

5. The charging system of claim 4, further comprising:
    a pump configured to supply the liquid through the second liquid inlet port into the second air pocket at a pressure greater than an operating pressure of the oxidation reactor.

6. The charging system of claim 1, wherein the vessel does not include mechanical moving parts.

7. The charging system of claim 1, wherein the vessel includes a U-shaped hollow interior cavity, wherein U-shaped hollow interior cavity is configured to define the first air pocket at a top of a first straight leg of the U-shaped hollow interior cavity, to define the second air pocket at a top of a second straight leg of the U-shaped hollow interior cavity, wherein the first and second straight legs are connected by a curved portion of the hollow interior cavity, and is configured to contain the liquid slug in the hollow interior cavity between the first and second air pockets.

8. The charging system of claim 1, further comprising:
    a vapor condenser coupled to the second air pocket, wherein the vapor condenser is configured for receiving the gas released from the second air pocket and for condensing liquid contained in the received gas.

9. The charging system of claim 1, further comprising:
    a blower configured for pushing air into the first air pocket at a pressure that exceeds atmospheric pressure.

10. The charging system of claim 1, further comprising:
a liquid outlet port configured to release liquid from the hollow interior cavity into the oxidation reactor at a pressure that exceeds the operating pressure of the oxidation reactor, wherein the plurality of valves includes a seventh valve configured to control the release of liquid from the hollow interior cavity into the oxidation reactor.

11. The charging system of claim 10, further comprising:
a chamber configured for containing fuel for combustion in the oxidation reactor, the chamber being coupled to the liquid outlet port of the vessel and being coupled to the oxidation reactor, wherein the chamber is configured to receive liquid released through the liquid outlet port of the vessel, to mix the fuel with the released liquid and to deliver a mixture of the fuel and the released liquid to the oxidation reactor.

12. The charging system of claim 1, further comprising:
a pressure transducer coupled to the first air pocket and configured to measure a pressure of the first air pocket, wherein the controller is configured to receive a signal from the pressure transducer indicating a pressure of the first air pocket.

13. The charging system of claim 1, further comprising:
a sparger configured for receiving the gas from the oxidation reactor for admission into the second air pocket, wherein the sparger is located such that the gas from the oxidation reactor is emitted from the sparger into the liquid slug at least some time during the cycle.

14. The charging system of claim 13, wherein the sparger is located such that the gas from the oxidation reactor is emitted from the sparger into the second air pocket, when the second air pocket is located above the liquid slug, at least some time during the cycle.

15. The charging system of claim 1, wherein the charging system is one of a plurality of charging systems that are substantially functionally identical, and wherein the plurality of charging systems are coupled by a manifold.

16. The charging system of claim 1, wherein the charge gas includes air.

17. The charging system of claim 1, wherein the charge gas includes fuel gas for combustion in the oxidation reactor.

18. A method of charging a reactor with charge gas using energy from the reactor, the method comprising, in a vessel having one or more walls that define a hollow interior cavity partially filled with a liquid slug, a first air pocket within the hollow interior cavity on a first side of the liquid slug, and a second air pocket within the hollow interior cavity on a second side of the liquid slug:
(a) drawing charge gas into the first air pocket through a port connected to the first air pocket by dropping a level of the liquid slug below the first air pocket and raising a level of the liquid slug below the second air pocket, wherein the liquid slug forms a water trap seal against the one or more walls that that define the hollow interior cavity between the first and second air pockets;
(b) receiving gas from a reactor into the second air pocket, wherein receiving the gas from a reactor into the second air pocket lowers a level of the liquid slug below the second air pocket and raises a level of the liquid slug below the first air pocket to compress a volume of the drawn-in charge gas in the first air pocket;
(c) injecting water into the second air pocket, wherein the second air pocket has a temperature that causes the injected water to vaporize and pressurize the drawn-in charge gas in the first air pocket; and
(d) injecting the pressurized drawn-in charge gas from the first air pocket into the reactor when a pressure of the first air pocket exceeds an operating pressure of the reactor.

19. The method of claim 18, further comprising:
injecting liquid from the liquid slug into the reactor when the pressure of the liquid slug exceeds the operating pressure of the reactor.

20. The method of claim 19, further comprising:
injecting the liquid from the liquid slug into a chamber configured for containing fuel for combustion in the reactor, the chamber being coupled to a liquid outlet port of the vessel and being coupled to the reactor;
mixing the liquid with the fuel; and
delivering a mixture of the fuel and the liquid to the reactor.

21. The method of claim 18, wherein the injected water has pressure that exceeds the operating pressure of the reactor.

22. The method of claim 18, wherein the injected water has a temperature that is lower than a temperature of the second air pocket.

23. The method of claim 18, further comprising releasing gas from the second air pocket to a condenser after the level of the liquid slug is lowered below the second air pocket.

24. The method of claim 18, further comprising: performing (a), (b), (c), and (d), such that the liquid slug cycles within in the hollow interior cavity with an oscillation frequency, wherein the oscillation frequency is within 10% of a natural oscillation frequency of the liquid slug in the hollow interior cavity.

25. The method of claim 18, wherein the charge gas includes air.

26. The method of claim 18, wherein the charge gas includes fuel gas for combustion in the reactor.

* * * * *